US011085583B2

(12) United States Patent
Ogiwara (10) Patent No.: US 11,085,583 B2
(45) Date of Patent: Aug. 10, 2021

(54) HIGH PRESSURE TANK APPARATUS AND METHOD OF CONTROLLING SAME

(71) Applicant: HONDA MOTOR CO., LTD., Tokyo (JP)

(72) Inventor: Naoki Ogiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 16/293,013

(22) Filed: Mar. 5, 2019

(65) Prior Publication Data

US 2019/0277446 A1 Sep. 12, 2019

(30) Foreign Application Priority Data

Mar. 7, 2018 (JP) .............................. JP2018-040384

(51) Int. Cl.
*F16K 17/36* (2006.01)
*F17C 1/04* (2006.01)
(Continued)

(52) U.S. Cl.
CPC ............... *F17C 1/04* (2013.01); *F16K 17/20* (2013.01); *F17C 13/025* (2013.01); *F17C 13/04* (2013.01);
(Continued)

(58) Field of Classification Search
CPC .... F17C 1/04; F17C 7/02; F17C 13/02; F17C 2203/0604
See application file for complete search history.

(56) References Cited

U.S. PATENT DOCUMENTS 3,137,405 A * 6/1964 Gorcey ..................... F17C 1/10
220/590
5,701,928 A * 12/1997 Aoki ..................... F17C 13/123
137/312
(Continued)

FOREIGN PATENT DOCUMENTS

CN      107364349 A     11/2017
JP      2003-172500 A    6/2003
JP      2009-243675 A   10/2009

OTHER PUBLICATIONS

Office Action including search report dated Aug. 26, 2020 issued over the corresponding Chinese Patent Application No. 201910168360.5 with the English translation thereof.

*Primary Examiner* — Reinaldo Sanchez-Medina
(74) *Attorney, Agent, or Firm* — Carrier Blackman & Associates, P.C.; William D. Blackman; Joseph P. Carrier (57) ABSTRACT

A high pressure tank of a high pressure tank apparatus includes: a resin-made liner; a reinforced layer; a supplying/discharging hole to which a supplying/discharging flow path is connected via a connecting section; and a supplying/discharging-side lead-out hole that leads out a fluid interposing between the liner and the reinforced layer. A leaked fluid storage section is capable of storing a leaked fluid that has leaked from the connecting section. A supplying/discharging-side discharge flow path is provided independently from the leaked fluid storage section, and, when an opening/closing valve opens, discharges to the air a temporary release fluid that has been led out via the supplying/discharging-side lead-out hole. A control section, when it has judged, based on a detection result of a detecting unit, that there is a condition enabling the temporary release fluid to be discharged, opens the opening/closing valve.

14 Claims, 5 Drawing Sheets

(51) Int. Cl.
*F17C 13/06* (2006.01)
*F17C 13/02* (2006.01)
*F16K 17/20* (2006.01)
*F17C 13/04* (2006.01)

(52) U.S. Cl.
CPC ...... *F17C 13/06* (2013.01); *F17C 2201/0109* (2013.01); *F17C 2201/035* (2013.01); *F17C 2203/011* (2013.01); *F17C 2203/0604* (2013.01); *F17C 2203/066* (2013.01); *F17C 2205/0308* (2013.01); *F17C 2205/0326* (2013.01); *F17C 2221/012* (2013.01); *F17C 2250/03* (2013.01); *F17C 2250/043* (2013.01); *F17C 2250/0478* (2013.01); *F17C 2260/038* (2013.01); *F17C 2270/0168* (2013.01); *F17C 2270/0184* (2013.01)

(56) References Cited

U.S. PATENT DOCUMENTS

| | | | | |
|---|---|---|---|---|
| 9,217,539 | B2 * | 12/2015 | Ishitoya | B60K 15/07 |
| 10,697,590 | B2 * | 6/2020 | Kanezaki | F17C 13/06 |
| 10,788,161 | B2 * | 9/2020 | Ogiwara | F17C 13/02 |
| 2011/0240655 | A1 * | 10/2011 | Lindner | F17C 13/026 |
| | | | | 220/589 |
| 2012/0291878 | A1 * | 11/2012 | Pisot | F17C 1/06 |
| | | | | 137/315.01 |
| 2016/0025266 | A1 * | 1/2016 | Leavitt | F17C 1/06 |
| | | | | 206/0.6 |
| 2017/0331130 | A1 | 11/2017 | Kawase et al. | |

\* cited by examiner

HIGH PRESSURE TANK APPARATUS AND METHOD OF CONTROLLING SAME

CROSS-REFERENCE TO RELATED APPLICATION

This application is based upon and claims the benefit of priority from Japanese Patent Application No. 2018-040384 filed on Mar. 7, 2018, the contents of which are incorporated herein by reference.

BACKGROUND OF THE INVENTION

Field of the Invention

The present invention relates to a high pressure tank apparatus that is mounted in a mounting body and includes a high pressure tank, and in which a fluid is supplied/discharged to/from a resin-made liner of the high pressure tank via a discharging/supplying flow path, and to a method of controlling the high pressure tank apparatus.

Description of the Related Art

There is known a high pressure tank that includes: a resin-made liner capable of storing a fluid on its inside; a reinforced layer configured from the likes of a fiber-reinforced plastic that covers an outer surface of the liner; a cap that is provided in an opening of the liner and the reinforced layer and has formed therein an insertion hole that communicates the inside and an outside of the liner; and an inserting member that is inserted in the insertion hole. The inserting member has formed therein a supplying/discharging hole penetrating the inserting member, and a supplying/discharging flow path for supplying/discharging the fluid to/from the inside of the liner is connected to the supplying/discharging hole via a connecting section. Moreover, the inserting member has incorporated therein a main stop valve by which communication or blocking communication between the inside of the liner and the supplying/discharging flow path via the supplying/discharging hole can be switched.

In a high pressure tank apparatus including this kind of high pressure tank, there is generally included a configuration enabling detection of fluid leaking from the high pressure tank, and so on, during an abnormality of the high pressure tank apparatus. Moreover, when leakage during an abnormality has been detected, a countermeasure such as closing the above-described main stop valve to stop supplying/discharging of the fluid is taken. As an example of a configuration enabling detection of leakage during an abnormality, there may be cited: a storage section surrounding the likes of the high pressure tank or supplying/discharging flow path to enable storage of a leaked fluid that has leaked; and a sensor that detects the fluid within the storage section.

Incidentally, as described in the likes of Japanese Laid-Open Patent Publication No. 2009-243675, for example, in a high pressure tank including a resin-made liner, the fluid sometimes permeates the liner to enter between the outer surface of the liner and the reinforced layer (hereafter, also called a covered section), and so on.

There is concern that if the fluid accumulates in the covered section, there will more easily occur the likes of separation of the liner and the reinforced layer, or buckling where the liner projects toward its inside. Therefore, the fluid that has permeated the liner to enter the covered section is preferably led out to outside of the covered section.

The fluid led out from the covered section (hereafter, also called a temporary release fluid) occurs in a temporarily limited amount, hence is discharged to the air, and so on, as part of normal operation of the high pressure tank apparatus. In other words, the temporary release fluid differs from the leaked fluid that leaks during an abnormality of the high pressure tank apparatus.

SUMMARY OF THE INVENTION

In the high pressure tank apparatus provided with the storage section or sensor as described above, the temporary release fluid and the leaked fluid are similarly stored in the storage section, hence there is concern that when the temporary release fluid that has been led out during normal operation has been detected by the sensor, it will end up being mistakenly detected that the leaked fluid leaking during an abnormality has occurred.

A main object of the present invention is to provide a high pressure tank apparatus in which it can be avoided being mistakenly detected during normal operation that a leakage during an abnormality has occurred, and moreover, in which it is possible for a temporary release fluid to be discharged to the air at an appropriate timing.

Another object of the present invention is to provide a method of controlling the above-described high pressure tank apparatus.

According to one embodiment of the present invention, there is provided a high pressure tank apparatus that is mounted in a mounting body and includes a high pressure tank, and in which a fluid is supplied/discharged to/from a resin-made liner of the high pressure tank via a supplying/discharging flow path, the high pressure tank including: a reinforced layer covering an outer surface of the liner; a supplying/discharging hole that communicates the supplying/discharging flow path and an inside of the liner; and a cap having formed therein a lead-out hole that leads out the fluid interposing between the liner and the reinforced layer, the high pressure tank apparatus including: a leaked fluid storage section capable of storing a leaked fluid being the fluid that has leaked from at least a connecting section of the supplying/discharging flow path and the supplying/discharging hole; a discharge flow path that is provided independently from the leaked fluid storage section and that discharges to the air a temporary release fluid being the fluid that has been led out via the lead-out hole; an opening/closing valve that opens/closes the discharge flow path; a detecting unit that detects whether or not a periphery of the mounting body is in a condition enabling the temporary release fluid to be discharged; and a control section that when it has judged, based on a detection result of the detecting unit, that there is the condition enabling the temporary release fluid to be discharged, opens the opening/closing valve.

The connecting section of the supplying/discharging flow path and the supplying/discharging hole is a place set so as to prevent leakage of the fluid occurring during normal operation of the high pressure tank apparatus. Therefore, the leaked fluid being the fluid that has leaked from at least the connecting section is a fluid that has leaked due to an abnormality occurring in the high pressure tank apparatus. On the other hand, the temporary release fluid is a fluid that, during normal operation of the high pressure tank apparatus, has permeated the liner to enter between the outer surface of the liner and the reinforced layer (hereafter, also called a covered section), and has then been led out to outside of the covered section via the lead-out hole.

In this high pressure tank apparatus, the leaked fluid storage section storing the leaked fluid and the supplying/discharging-side discharge flow path into which the temporary release fluid flows, are provided independently. Thus, since the leaked fluid can be stored separately from the temporary release fluid in the leaked fluid storage section, the leaked fluid that leaks during an abnormality can be detected distinctly from the temporary release fluid led out during normal operation. As a result, it can be avoided that during normal operation of the high pressure tank apparatus, it is mistakenly detected that leakage during an abnormality has occurred.

Moreover, the control section, when it has judged from the detection result of the detecting unit that there is the condition enabling the temporary release fluid to be discharged, opens the opening/closing valve that opens/closes the supplying/discharging flow path. It therefore becomes possible for the temporary release fluid that has flowed into the discharge flow path to be discharged at an appropriate timing when the air in the periphery of the mounting body attains the condition enabling the temporary release fluid to be discharged.

In the above-described high pressure tank apparatus, it is preferable that the detecting unit is capable of detecting whether or not the mounting body is in a moving state, and that the control section, when it has been detected by the detecting unit that the mounting body is in the moving state, judges there to be the condition enabling the temporary release fluid to be discharged. When the mounting body is in the moving state, the temporary release fluid that has been discharged from the discharge flow path can be dispersed by a wind pressure of a running wind, hence the condition enabling the temporary release fluid to be discharged is satisfied. It therefore becomes possible for the temporary release fluid to be discharged at an appropriate timing, by opening the opening/closing valve, when it has been detected by the detecting unit that the mounting body is in the moving state.

In the above-described high pressure tank apparatus, it is preferable that the detecting unit is capable of detecting whether or not the fluid is being filled into the liner, and that the control section, when, in the case that the mounting body is not detected to be in the moving state, it has been detected by the detecting unit that the fluid is being filled, judges there to be the condition enabling the temporary release fluid to be discharged. Filling of the fluid into the liner is performed at a place suited to handling of the fluid. Therefore, when the fluid is being filled into the liner, the condition enabling the temporary release fluid to be discharged is satisfied. It thus becomes possible for the temporary release fluid to be discharged at an appropriate timing, by opening the opening/closing valve judging there to be the condition enabling the temporary release fluid to be discharged, when it has been detected that the fluid is being filled into the liner, even in the case that the mounting body is not detected to be in the moving state. In other words, it becomes possible for the temporary release fluid to be discharged at a more appropriate timing, conforming with the state of the mounting body.

In the above-described high pressure tank apparatus, it is preferable that the detecting unit is capable of detecting a current position of the mounting body, and that the control section, when, in the case that the mounting body is not detected to be in the moving state, it has been detected by the detecting unit that the current position is a supplying place of the fluid, judges there to be the condition enabling the temporary release fluid to be discharged.

The supplying place of the fluid is a place suited to handling of the fluid, hence when the current position of the mounting body is the supplying place of the fluid, the condition enabling the temporary release fluid to be discharged is satisfied. It therefore becomes possible for the temporary release fluid to be discharged at an appropriate timing, by opening the opening/closing valve judging there to be the condition enabling the temporary release fluid to be discharged, when it has been detected that the current position of the mounting body is the supplying place of the fluid, even in the case that the mounting body is not detected to be in the moving state. In other words, it becomes possible for the temporary release fluid to be discharged at a more appropriate timing, conforming with the state of the mounting body.

In the above-described high pressure tank apparatus, it is preferable that the detecting unit is capable of detecting a wind pressure in the periphery of the mounting body, and that the control section, when it has been detected by the detecting unit that the wind pressure is a given value or more, judges there to be the condition enabling the temporary release fluid to be discharged. When the temporary release fluid becomes dispersible due to a running wind occurring during movement of the mounting body or an inflowing natural wind during stopping of the mounting body, the condition enabling the temporary release fluid to be discharged is satisfied. It therefore becomes possible for the temporary release fluid to be discharged at an appropriate timing, by opening the opening/closing valve, when, for example, a minimum value of the wind pressure enabling the temporary release fluid to be dispersed is preset as the given value and the wind pressure detected by the detecting unit is the given value or more.

In the above-described high pressure tank apparatus, it is preferable that the detecting unit is capable of detecting whether or not the fluid is being filled into the liner, and that the control section, when it has been detected by the detecting unit that the fluid is being filled into the liner, judges there to be the condition enabling the temporary release fluid to be discharged. When the fluid is being filled into the liner, the condition enabling the temporary release fluid to be discharged is satisfied. It therefore becomes possible for the temporary release fluid to be discharged at an appropriate timing, by opening the opening/closing valve judging there to be the condition enabling the temporary release fluid to be discharged, when it has been detected by the detecting unit that the fluid is being filled into the liner.

In the above-described high pressure tank apparatus, it is preferable that the detecting unit is capable of detecting a current position of the mounting body, and that the control section, when it has been detected by the detecting unit that the current position is a supplying place of the fluid, judges there to be the condition enabling the temporary release fluid to be discharged. When the current position of the mounting body is the supplying place of the fluid, the condition enabling the temporary release fluid to be discharged is satisfied. It therefore becomes possible for the temporary release fluid to be discharged at an appropriate timing, by opening the opening/closing valve judging there to be the condition enabling the temporary release fluid to be discharged, when it has been detected by the detecting unit that the current position of the mounting body is the supplying place of the fluid.

According to another embodiment of the present invention, there is provided a method of controlling a high pressure tank apparatus that is mounted in a mounting body and includes a high pressure tank, and in which a fluid is supplied/discharged to/from a resin-made liner of the high pressure tank via a supplying/discharging flow path, the high pressure tank including: a reinforced layer covering an outer surface of the liner; a supplying/discharging hole that communicates the supplying/discharging flow path and an inside of the liner; and a cap having formed therein a lead-out hole that leads out the fluid interposing between the liner and the reinforced layer, and the high pressure tank apparatus including: a leaked fluid storage section capable of storing a leaked fluid being the fluid that has leaked from at least a connecting section of the supplying/discharging flow path and the supplying/discharging hole; a discharge flow path that is provided independently from the leaked fluid storage section and that discharges to the air a temporary release fluid being the fluid that has been led out via the lead-out hole; an opening/closing valve that opens/closes the discharge flow path; a detecting unit that detects whether or not a periphery of the mounting body is in a condition enabling the temporary release fluid to be discharged; and a control section that opens/closes the opening/closing valve, the method of controlling the high pressure tank apparatus including: a judging step where it is judged by the control section, based on a detection result of the detecting unit, whether or not there is the condition enabling the temporary release fluid to be discharged; and a valve-opening step where when, in the judging step, it has been judged by the control section that there is the condition enabling the temporary release fluid to be discharged, the opening/closing valve is opened.

The leaked fluid storage section storing the leaked fluid and the discharge flow path into which the temporary release fluid flows, are provided independently, and the leaked fluid can be stored separately from the temporary release fluid in the leaked fluid storage section. Thus, the leaked fluid can be detected distinctly from the temporary release fluid, hence it can be avoided that during normal operation of the high pressure tank apparatus, it is mistakenly detected that leakage during an abnormality has occurred.

Moreover, when it has been judged by the judging step that there is the condition enabling the temporary release fluid to be discharged, the valve-opening step is performed, whereby the opening/closing valve that opens/closes the supplying/discharging flow path, is opened. Therefore, the temporary release fluid that has been caused to flow into the discharge flow path can be discharged at an appropriate timing when the condition enabling the temporary release fluid to be discharged is attained.

In the above-described method of controlling a high pressure tank apparatus, it is preferable that when it has been detected by the detecting unit that the mounting body is in a moving state, it is judged by the control section in the judging step that there is the condition enabling the temporary release fluid to be discharged. Judging in this way makes it possible for the temporary release fluid to be discharged at an appropriate timing.

In the above-described method of controlling a high pressure tank apparatus, it is preferable that when, in the case that the mounting body is not detected to be in the moving state, it has been detected by the detecting unit that the fluid is being filled into the liner, it is judged in the judging step that there is the condition enabling the temporary release fluid to be discharged. Judging in this way makes it possible for the temporary release fluid to be discharged at a more appropriate timing, conforming with the state of the mounting body.

In the above-described method of controlling a high pressure tank apparatus, it is preferable that when, in the case that the mounting body is not detected to be in the moving state, it has been detected by the detecting unit that a current position of the mounting body is a supplying place of the fluid, it is judged in the judging step that there is the condition enabling the temporary release fluid to be discharged. Judging in this way makes it possible for the temporary release fluid to be discharged at a more appropriate timing, conforming with the state of the mounting body.

In the above-described method of controlling a high pressure tank apparatus, it is preferable that when it has been detected by the detecting unit that a wind pressure in the periphery of the mounting body is a given value or more, it is judged in the judging step that there is the condition enabling the temporary release fluid to be discharged. Judging in this way makes it possible for the temporary release fluid to be discharged at an appropriate timing.

In the above-described method of controlling a high pressure tank apparatus, it is preferable that when it has been detected by the detecting unit that the fluid is being filled into the liner, it is judged in the judging step that there is the condition enabling the temporary release fluid to be discharged. Judging in this way makes it possible for the temporary release fluid to be discharged at an appropriate timing.

In the above-described method of controlling a high pressure tank apparatus, it is preferable that when it has been detected by the detecting unit that a current position of the mounting body is a supplying place of the fluid, it is judged in the judging step that there is the condition enabling the temporary release fluid to be discharged. Judging in this way makes it possible for the temporary release fluid to be discharged at an appropriate timing.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a high pressure tank apparatus and a method of controlling the same according to the present invention will be presented and described in detail with reference to the accompanying drawings. Note that in the drawings below, configuring elements displaying the same or similar functions and advantages will be assigned with the same reference symbols, and repeated descriptions thereof will sometimes be omitted.

Figure 1:
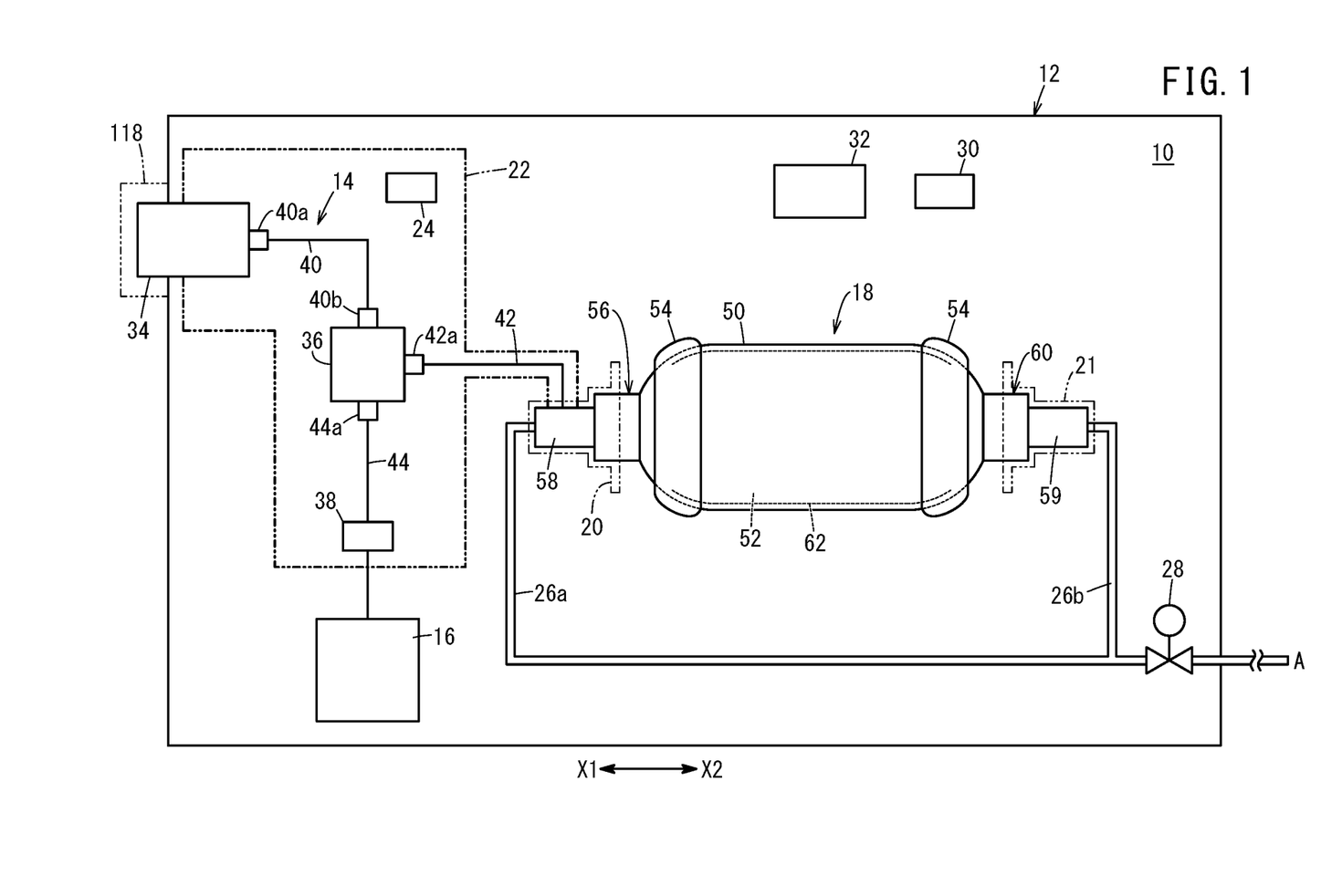
FIG. 1 is a schematic configuration diagram of a high pressure tank apparatus and a supplying/discharging flow path according to an embodiment of the present invention.

As shown in FIG. 1, a high pressure tank apparatus 10 according to the present embodiment can be preferably employed as a high pressure tank apparatus that is mounted in a mounting body 12 being a fuel cell vehicle such as a fuel cell electric automobile, for example, and that includes a high pressure tank 18 storing a hydrogen gas supplied to a fuel cell system 16 via a supplying/discharging flow path 14. Accordingly, although the present embodiment describes an example where the mounting body 12 is assumed to be a fuel cell vehicle and the high pressure tank 18 stores hydrogen gas as a fluid, the present embodiment is not particularly limited to this. The high pressure tank apparatus 10 may be mounted in a mounting body 12 other than a fuel cell vehicle, and it is also possible for a fluid other than hydrogen gas to be stored in the high pressure tank 18.

The high pressure tank apparatus 10 mainly includes: the high pressure tank 18 that is supplied with/discharges a hydrogen gas via the supplying/discharging flow path 14; cover members 20, 21; a leaked fluid storage section 22; a leakage detecting sensor 24; a supplying/discharging-side discharge flow path 26*a* (a discharge flow path); an end-side discharge flow path 26*b*; an opening/closing valve 28; a detecting unit 30; and a control section 32.

The supplying/discharging flow path 14 is for example configured capable of supplying to the high pressure tank 18 via a branch path 36 the hydrogen gas that has been supplied from a filling port 34, and capable of supplying to a regulator 38 via the branch path 36 the hydrogen gas that has been discharged from the high pressure tank 18 and after the hydrogen gas is pressure-adjusted, supplying the hydrogen gas to the fuel cell system 16. In this case, the supplying/discharging flow path 14 is configured by the likes of: a pipe 40 connecting between the filling port 34 and the branch path 36; a pipe 42 connecting the branch path 36 and the high pressure tank 18; and a pipe 44 connecting the branch path 36 and the fuel cell system 16 via the regulator 38.

One end section of the pipe 40 is provided with a connecting section 40*a* that connects the pipe 40 with the filling port 34, and the other end section of the pipe 40 is provided with a connecting section 40*b* that connects the pipe 40 with the branch path 36. One end section of the pipe 42 is provided with a connecting section 42*a* that connects the pipe 42 with the branch path 36, and the other end section of the pipe 42 is provided with a connecting section 42*b* (a connecting section, refer to FIG. 2) that connects the pipe 42 with the high pressure tank 18. One end section of the pipe 44 is provided with a connecting section 44*a* that connects pipe 44 with the branch path 36. Each of these connecting sections 40*a*, 40*b*, 42*a*, 42*b*, 44*a* is formed in an airtight manner so as to prevent leakage of the hydrogen gas occurring during normal operation of the high pressure tank apparatus 10.

Figure 2:
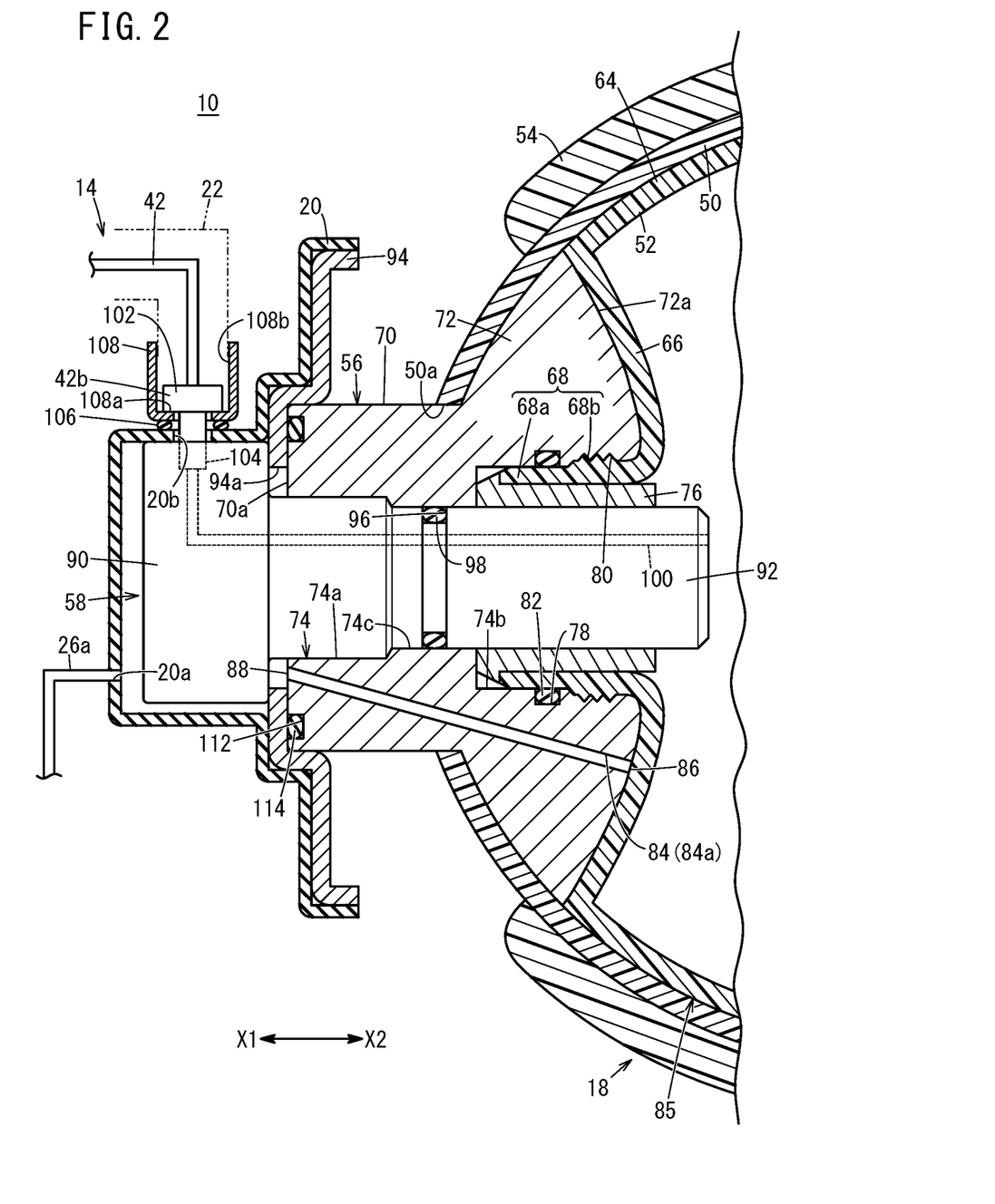
FIG. 2 is an enlarged cross-sectional view of essential parts on a side of one end in an axial direction of the high pressure tank apparatus of FIG. 1.
Figure 3:
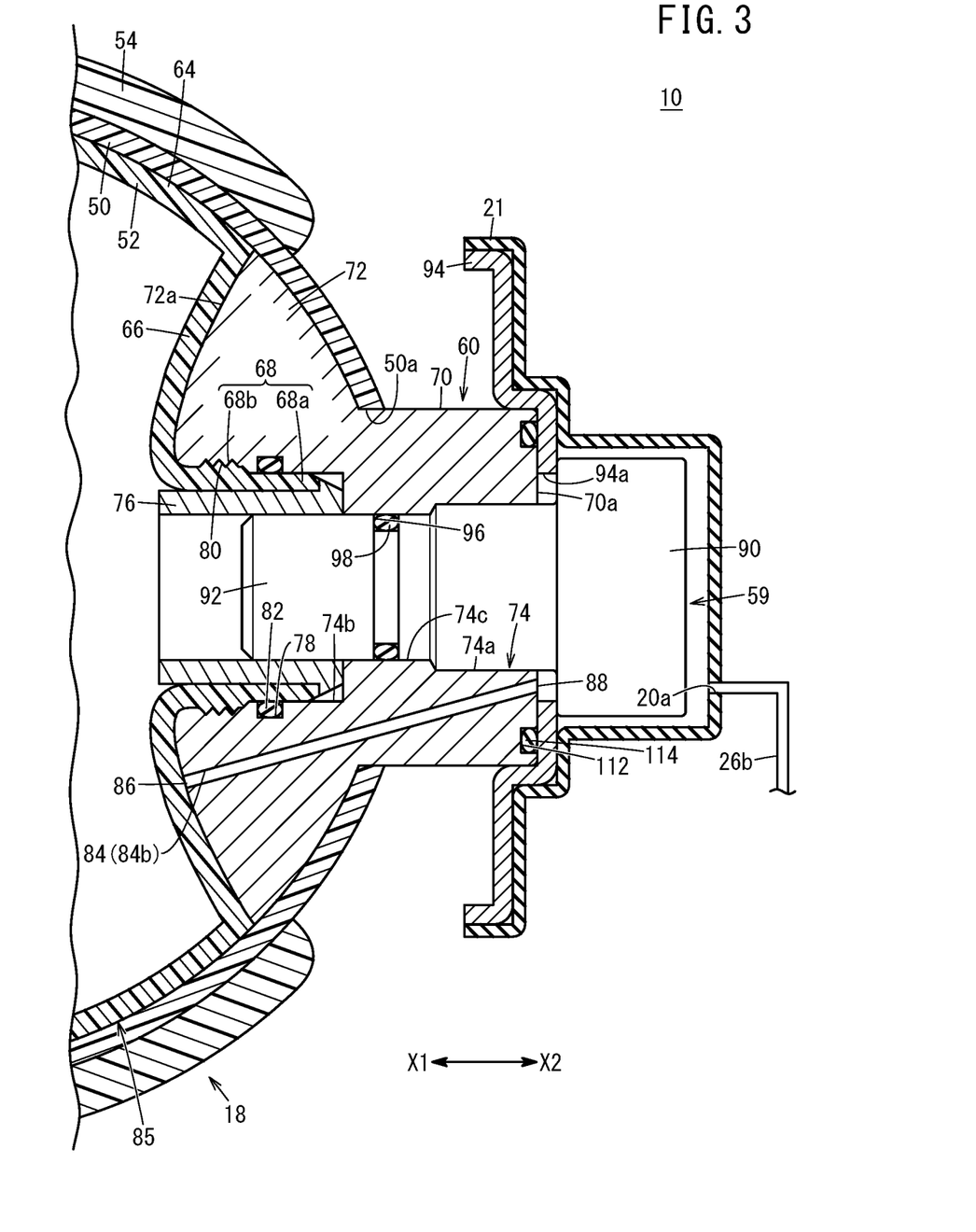
FIG. 3 is an enlarged cross-sectional view of essential parts on a side of the other end in the axial direction of the high pressure tank apparatus of FIG. 1.

As shown in FIGS. 1 to 3, the high pressure tank 18 includes a reinforced layer 50, a liner 52, a protective member 54, a supplying/discharging-side cap 56 (a cap), inserting members 58, 59, and an end-side cap 60. The high pressure tank 18 has the supplying/discharging-side cap 56 provided on one end side (a side of arrow X1 in FIG. 1) in its axial direction (hereafter, the axial direction of the high pressure tank 18 will also simply be called an axial direction), and has the end-side cap 60 provided on its other end side (a side of arrow X2 in FIG. 1) in the axial direction.

The reinforced layer 50 is configured from the likes of a carbon fiber reinforced plastic (CFRP), and covers an outer surface of the liner 52, and so on. The liner 52 is a hollow body configured from a resin, and is capable of storing the hydrogen gas on its inside. Specifically, the liner 52 includes: a cylindrical trunk section 62 (refer to FIG. 1); a dome-like section 64 (refer to FIGS. 2 and 3) provided on both sides in the axial direction of the trunk section 62; a sunken section 66 (refer to FIGS. 2 and 3) provided on both sides in the axial direction of the dome-like section 64; and a cylindrical section 68 (refer to FIGS. 2 and 3) that projects from the sunken section 66 and has a smaller diameter than the trunk section 62. Note that in the present embodiment, the reinforced layer 50 and the liner 52 have their one end side and their other end side in the axial direction configured substantially similarly.

The sunken section 66 sinks toward the inside where the hydrogen gas of the liner 52 is stored. The cylindrical section 68 has a thin section 68*a* provided on its projecting end side (a side of arrow X1 in FIG. 2), and has a male thread 68*b* provided more to its base end side (a side of arrow X2 in FIG. 2) than the thin section 68*a*.

The protective member 54 is configured from the likes of a resin, for example, and covers, via the reinforced layer 50, mainly a boundary portion of the dome-like section 64 and trunk section 62 of the liner 52 and a periphery of the boundary portion. By the protective member 54 being thus provided, impact resistance, and so on, of the high pressure tank 18 can be improved.

As shown in FIG. 2, the supplying/discharging-side cap 56 is made of a metal, for example, and is sheathed by the cylindrical section 68 of the liner 52. Moreover, the supplying/discharging-side cap 56 includes a cylindrical projection 70 and a shoulder section 72 that extends outwardly in a radial direction from a base end of the projection 70, and there is an insertion hole 74 formed penetrating along an axial direction of the projection 70. An end surface 72*a* on an opposite side to the projection 70 (the side of arrow X2 in FIG. 2), of the shoulder section 72 faces an outer surface of the sunken section 66 of the liner 52. Moreover, an outer peripheral surface of the shoulder section 72, along with the trunk section 62 and dome-like section 64 of the liner 52, are covered by the reinforced layer 50. The projection 70 projects so as to be exposed from an opening 50*a* provided in the reinforced layer 50.

The insertion hole 74 has diameters that differ depending on regions and includes: a medium inner diameter hole 74*a* positioned on a tip surface 70*a* (an exposed surface) side of the projection 70; a large inner diameter hole 74*b* positioned on an end surface 72*a* side of the shoulder section 72; and a small inner diameter hole 74*c* positioned between these medium inner diameter hole 74*a* and large inner diameter hole 74*b*. The cylindrical section 68 of the liner 52 is inserted in the large inner diameter hole 74*b*, and a cylindrical collar 76 is press-fitted into the cylindrical section 68. As a result, the cylindrical section 68 is supported between an inner circumferential surface of the large inner diameter hole 74*b* and an outer circumferential surface of the collar 76.

An annular seal groove 78 that follows a circumferential direction is formed in an inner wall of the large inner diameter hole 74*b* in a region facing the thin section 68*a* of the cylindrical section 68, and a female thread 80 that is screwed onto the male thread 68*b* of the cylindrical section 68 is formed in the inner wall of the large inner diameter hole 74*b* in a region facing the male thread 68*b*. A seal member 82 configured from an O ring is arranged on an inside of the seal groove 78, whereby a seal is made between the outer circumferential surface of the cylindrical section 68 and the inner circumferential surface of the large inner diameter hole 74b. Moreover, by the male thread 68b and the female thread 80 being screwed to and engaged with each other, the cylindrical section 68 of the liner 52 and the supplying/discharging-side cap 56 are joined.

The supplying/discharging-side cap 56 has further formed therein a lead-out hole 84 penetrating the supplying/discharging-side cap 56. The lead-out hole 84 is provided in order for the hydrogen gas interposing between the liner 52 and the reinforced layer 50 (hereafter, also called a covered section 85) to be led out to outside of the covered section 85. Specifically, one of openings, namely, an opening 86, of the lead-out hole 84 is provided in the end surface 72a of the supplying/discharging-side cap 56, and the other of the openings, namely, an opening 88, of the lead-out hole 84 is provided in the tip surface 70a of the projection 70. In other words, the hydrogen gas that has entered the covered section 85 flows into the lead-out hole 84 via the one of the openings, namely, the opening 86, and is discharged from the lead-out hole 84 via the other of the openings, namely, the opening 88. Hereafter, the hydrogen gas that has thus been led out to outside of the covered section 85 by the lead-out hole 84 will also be called a temporary release fluid. Note that the supplying/discharging-side cap 56 may be provided with only one lead-out hole 84, or may be provided with a plurality of the lead-out holes 84 at fixed intervals in a circumferential direction of the supplying/discharging-side cap 56.

The inserting member 58 includes: a head section 90 whose outer diameter is larger than a diameter of the medium inner diameter hole 74a; and an inserting section 92 that extends from the head section 90 toward an inside of the insertion hole 74. In the inserting member 58, the inserting section 92 is inserted in the insertion hole 74 along circumferential surfaces of the medium inner diameter hole 74a and small inner diameter hole 74c and an inner circumferential surface of the collar 76. At this time, a supporting plate 94 for attaching the cover member 20 to the high pressure tank 18 is sandwiched between the head section 90 of the inserting member 58 exposed from the insertion hole 74 and the tip surface 70a of the projection 70, as will be mentioned later.

An outer circumferential surface of a portion facing the small inner diameter hole 74c in the insertion hole 74, of the inserting section 92 has formed therein an annular seal groove 96 that follows the circumferential direction, and there is arranged on an inside of the seal groove 96 a seal member 98 configured from an O ring. As a result, a seal is made between an outer circumferential surface of the inserting section 92 and an inner circumferential surface of the insertion hole 74.

Moreover, a supplying/discharging hole 100 is formed on an inside of the inserting member 58 penetrating the inserting member 58. The pipe 42 of the supplying/discharging flow path 14 is connected to the supplying/discharging hole 100 via the connecting section 42b. As a result, the supplying/discharging hole 100 communicates the supplying/discharging flow path 14 and the inside of the liner 52. Moreover, an unillustrated main stop valve (an electromagnetic valve) is incorporated in the inside of the inserting member 58, and a configuration is adopted enabling a communicated state and a blocked state of the supplying/discharging flow path 14 and the inside of the liner 52 to be switched by opening/closing the main stop valve.

The connecting section 42b is configured from a large outer diameter section 102 and a small outer diameter section 104 of which the outer diameter is smaller than that of the large outer diameter section 102, and the connecting section 42b has the pipe 42 inserted in its inside. Moreover, the connecting section 42b, by having part of its small outer diameter section 104 inserted in the supplying/discharging hole 100, is fixed to the head section 90 of the inserting member 58. As will be mentioned later, the cover member 20, a seal member 106, and a separating member 108 interpose between the head section 90 and the large outer diameter section 102.

As shown in FIG. 3, the end-side cap 60 is configured similarly to the supplying/discharging-side cap 56 (refer to FIG. 2). In other words, the end-side cap 60 is sheathed by the cylindrical section 68 of the liner 52 via the insertion hole 74. Moreover, the end-side cap 60 also has formed therein penetrating the end-side cap 60 the lead-out hole 84 which is for the hydrogen gas that has entered the covered section 85 to be led out to outside of the covered section 85. Hereafter, the lead-out hole 84 provided in the supplying/discharging-side cap 56 will also be called a supplying/discharging-side lead-out hole 84a, and the lead-out hole 84 provided in the end-side cap 60 will also be called an end-side lead-out hole 84b.

The inserting member 59 is inserted in the insertion hole 74 of the end-side cap 60. The inserting member 59 is configured similarly to the inserting member 58, apart from there not being formed therein the supplying/discharging hole 100 and not being incorporated therein the above-described main stop valve, and apart from a length in the axial direction of its inserting section 92 being shorter than in the inserting member 58. The supporting plate 94 for attaching the cover member 21 to the high pressure tank 18 is sandwiched between the head section 90 of the inserting member 59 exposed from the insertion hole 74 and the tip surface 70a of the projection 70, as will be mentioned later.

As shown in FIG. 2, the supporting plate 94, by being sandwiched between the head section 90 and the projection 70 as described above, is attached to each of both end sides in the axial direction of the high pressure tank 18, so as to cover a tip side of the projection 70. Specifically, the supporting plate 94 has formed in substantially its center a plate through-hole 94a of larger diameter than an outer diameter of the inserting section 92 and of smaller diameter than the outer diameter of the head section 90. That is, the inserting section 92 is inserted in the coaxially overlapped plate through-hole 94a and insertion hole 74.

An annular seal groove 112 is formed in a place facing the supporting plate 94 more to an outer side in the radial direction of the projection 70 than the opening 88 on a side discharging the temporary release fluid of the lead-out hole 84 is, of the tip surface 70a of the projection 70. A seal member 114 configured from an O ring is arranged on an inside of this seal groove 112, whereby a seal is made between the projection 70 and the supporting plate 94.

The cover member 20 is configured from the likes of rubber or stainless steel (SUS), for example, and is attached to the supporting plate 94 so as to cover the opening 88 of the supplying/discharging-side lead-out hole 84a and the head section 90 being an exposed section exposed from the insertion hole 74 of the inserting member 58. As a result, the cover member 20 is configured capable of storing on its inside the temporary release fluid led out by the supplying/discharging-side lead-out hole 84a. Moreover, the cover member 20 has formed therein an insertion hole 20a in which the supplying/discharging-side discharge flow path 26a is inserted. The insertion hole 20a penetrates the cover member 20. The inside of the cover member 20 and the supplying/discharging-side discharge flow path 26a communicate via the insertion hole 20a. Therefore, configuring as described above enables the temporary release fluid stored on the inside of the cover member 20 to flow into the supplying/discharging-side discharge flow path 26a.

Furthermore, the cover member 20 has formed therein a through-hole 20b that exposes the connecting section 42b fixed to the head section 90 of the inserting member 58. A diameter of the through-hole 20b is smaller than the outer diameter of the large outer diameter section 102 of the connecting section 42b and larger than the outer diameter of the small outer diameter section 104 of the connecting section 42b. As described above, the following are sandwiched between the large outer diameter section 102 of the connecting section 42b and the head section 90 of the inserting member 58, namely: an outer circumferential portion of the through-hole 20b of the cover member 20; the seal member 106 configured from an O ring; and the separating member 108.

The separating member 108 has a bottomed cylindrical shape having a bottom section 108a in one end thereof, and the small outer diameter section 104 of the connecting section 42b is inserted in a through-hole formed in the bottom section 108a. Moreover, the leaked fluid storage section 22 is integrally connected to an opening section 108b side of the separating member 108. The seal member 106 interposes between the bottom section 108a of the separating member 108 and the cover member 20, whereby communication between the inside of the cover member 20 and the inside of the leaked fluid storage section 22 are blocked (sealed).

The cover member 21 is configured similarly to the cover member 20 apart from not being provided with the through-hole 20b, and is attached to the supporting plate 94 so as to cover the opening 88 of the end-side lead-out hole 84b and the head section 90 being an exposed section exposed from the insertion hole 74 of the inserting member 59. As a result, the cover member 21 is configured capable of storing on its inside the temporary release fluid led out by the end-side lead-out hole 84b. Moreover, the cover member 21 has formed therein the insertion hole 20a in which the end-side discharge flow path 26b is inserted. The insertion hole 20a penetrates the cover member 21. The inside of the cover member 21 and the end-side discharge flow path 26b communicate via the insertion hole 20a. Therefore, configuring as described above enables the temporary release fluid stored on the inside of the cover member 21 to flow into the end-side discharge flow path 26b.

As shown in FIGS. 1 and 2, the leaked fluid storage section 22 is configured by a wall section that at least surrounds the connecting section 42b connecting the pipe 42 of the supplying/discharging flow path 14 and the supplying/discharging hole 100, and the supplying/discharging flow path 14 including the other connecting sections 40a, 40b, 42a, 44a, for example. As a result, the leaked fluid storage section 22 is configured capable of storing the leaked fluid that has leaked, due to an abnormality occurring in the high pressure tank apparatus 10, from a place such as the connecting section 42b that has been designed not to leak the hydrogen gas during normal operation of the high pressure tank apparatus 10.

The leakage detecting sensor 24 (refer to FIG. 1) is arranged within the leaked fluid storage section 22, and detects the hydrogen gas within the leaked fluid storage section 22. It is possible to employ as the leakage detecting sensor 24 a variety of hydrogen sensors capable of detecting presence/absence of a leakage of the hydrogen gas or a leakage amount (concentration) of the hydrogen gas.

The supplying/discharging-side discharge flow path 26a communicates with the inside of the cover member 20, and the temporary release fluid flows into the supplying/discharging-side discharge flow path 26a from the inside of the cover member 20. Moreover, the supplying/discharging-side discharge flow path 26a is installed with and mediated by the opening/closing valve 28, and a configuration is adopted enabling the hydrogen gas that has flowed into the supplying/discharging-side discharge flow path 26a to be discharged to a discharge region A in the air by opening the opening/closing valve 28.

The end-side discharge flow path 26b communicates with the inside of the cover member 21, and the temporary release fluid flows into the end-side discharge flow path 26b from the inside of the cover member 21. Moreover, an end section on an opposite side to the cover member 21 of the end-side discharge flow path 26b communicates with an upstream side of the opening/closing valve 28 of the supplying/discharging-side discharge flow path 26a. This makes it possible for the temporary release fluid that has been led out by the end-side lead-out hole 84b to be discharged to the discharge region A by the end-side discharge flow path 26b when the opening/closing valve 28 opens.

The detecting unit 30 is provided for detecting whether or not a periphery of the mounting body 12 such as the discharge region A is in a condition enabling the temporary release fluid to be discharged. For example, the detecting unit 30 should be capable of detecting at least any one of: whether or not the mounting body 12 is in a moving state; a wind pressure in the periphery of the mounting body 12; whether or not the hydrogen gas is being filled into the liner 52; and a current position of the mounting body 12.

In the case of detecting whether or not the mounting body 12 is in the moving state, the detecting unit 30 should include a sensor that detects a rotational speed of a wheel (not illustrated) provided in the mounting body 12, for example. To detect the wind pressure in the periphery of the mounting body 12, the detecting unit 30 should include a wind pressure sensor, for example. To detect whether or not the hydrogen gas is being filled into the liner 52, the detecting unit 30 should be configured to be able to detect an opening/closing instruction to a lid 118 that is provided in the mounting body 12 so as to cover the filling port 34, for example. To detect the current position of the mounting body 12, the detecting unit 30 should include a global positioning system (GPS), for example.

The control section 32 is configured as a computer including the likes of an unillustrated CPU or unillustrated memory, and, based on a detection result of the detecting unit 30, judges whether or not there is the condition enabling the temporary release fluid to be discharged. Moreover, the control section 32, when it has judged there to be the condition enabling the temporary release fluid to be discharged, sets the opening/closing valve 28 to an opened state, and, when it has judged there to not be the condition enabling the temporary release fluid to be discharged, sets the opening/closing valve 28 to a closed state.

For example, when the mounting body 12 is in the moving state, a running wind occurs, hence the temporary release fluid can be dispersed by a wind pressure of the running wind. In other words, the condition enabling the temporary release fluid to be discharged is satisfied. Therefore, when it has been detected by the detecting unit 30 that the mounting body 12 is the moving state, the control section 32 judges there to be the condition enabling the temporary release fluid to be discharged.

Figure 4:
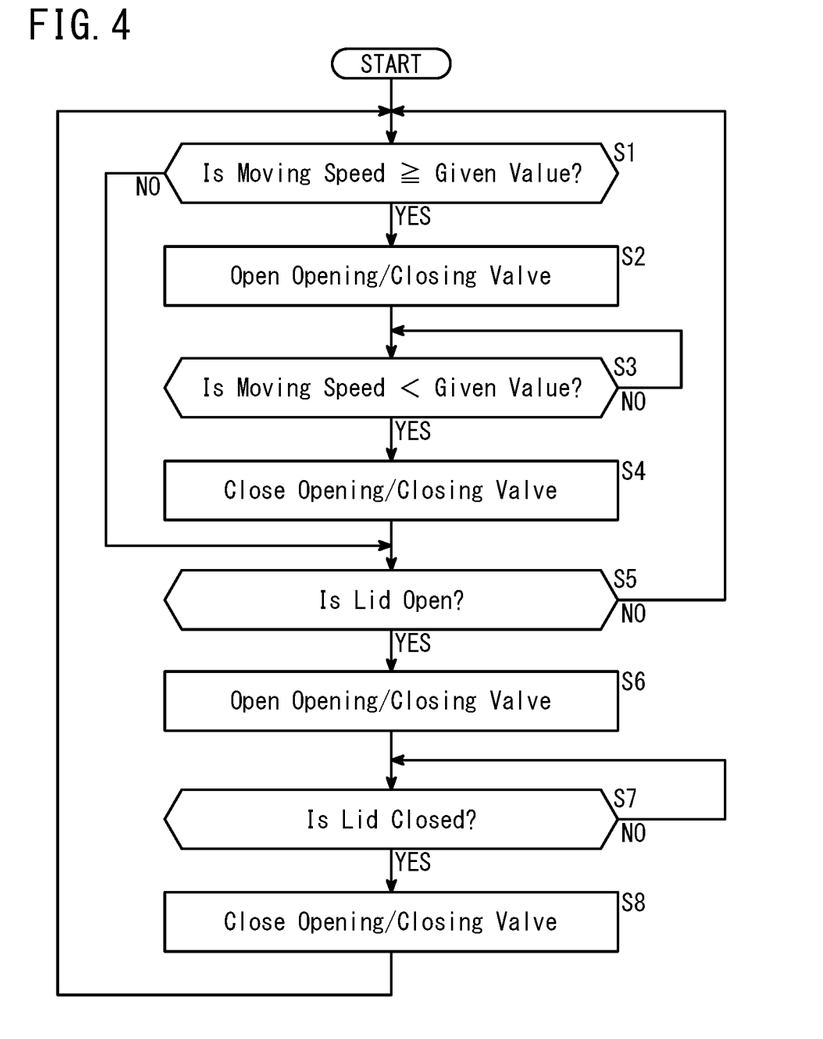
FIG. 4 is a flowchart explaining one example of a method of controlling the high pressure tank apparatus of FIG. 1.

Note that when a moving speed of the mounting body 12 increases, the wind pressure of the running wind also increases. It is therefore preferable that there be preset as a given value a minimum value of the moving speed of the mounting body 12 at which will be attained a wind pressure of the running wind enabling the temporary release fluid to be more reliably dispersed, and that, when it has been detected by the detecting unit 30 that the moving speed of the mounting body 12 is the given value or more, the control section 32 judges there to be the condition enabling the temporary release fluid to be discharged. Such a given value of the moving speed can be set to 10 km per hour, for example.

For example, when a running wind occurring during movement of the mounting body 12 or an inflowing natural wind during the likes of stopping of the mounting body 12 reaches a certain wind pressure and the temporary release fluid becomes dispersible due to a wind force of these winds, the condition enabling the temporary release fluid to be discharged is satisfied. Therefore, a wind pressure at which the temporary release fluid becomes dispersible as described above is preset as a given value, and when it has been detected by the detecting unit 30 that the wind pressure in the periphery of the mounting body 12 is the given value or more, the control section 32 judges there to be the condition enabling the temporary release fluid to be discharged.

For example, filling of the hydrogen gas into the liner 52 is performed at a place where there is no naked flame and which is suited to handling of the hydrogen gas, such as a hydrogen station. Therefore, when it has been detected by the detecting unit 30 that the fluid is being filled into the liner 52, the control section 32 judges there to be the condition enabling the temporary release fluid to be discharged.

For example, a supplying place of the hydrogen gas such as a hydrogen station is a place where there is no naked flame and which is suited to handling of the fluid. Therefore, when it has been detected by the detecting unit 30 that the current position of the mounting body 12 is the supplying place of the hydrogen gas, the control section 32 judges there to be the condition enabling the temporary release fluid to be discharged.

The high pressure tank apparatus 10 according to the present embodiment is basically configured as above. In operation at a normal time of the high pressure tank apparatus 10, when filling the hydrogen gas into the liner 52 of the high pressure tank 18, for example, an occupant of the mounting body 12 stops the mounting body 12 at the supplying place of the hydrogen gas, such as the hydrogen station, and presses a lid switch (not illustrated). As a result, an instruction to open the lid 118 is issued, and the filling port 34 is exposed from the opened lid 118. The hydrogen gas is supplied from a hydrogen replenishment source (not illustrated) to the supplying/discharging flow path 14 via this filling port 34. The hydrogen gas that has been supplied to the supplying/discharging flow path 14 is filled into the inside of the liner 52 via the pipe 40, the branch path 36, the pipe 42, the supplying/discharging hole 100, and the main stop valve in the opened state. When the hydrogen gas has been sufficiently filled into the liner 52, supplying of the hydrogen gas from the hydrogen replenishment source is stopped, and the lid 118 is closed.

When the hydrogen gas within the liner 52 is supplied to the fuel cell system 16, the hydrogen gas that has been discharged to the pipe 42 from within the liner 52 via the supplying/discharging hole 100 and the main stop valve in the opened state is sent to the regulator 38. This hydrogen gas has its pressure adjusted by the regulator 38, and is then supplied to the fuel cell system 16 via the pipe 44. As a result, an electrochemical reaction (an electrical energy generating reaction) occurs in the fuel cell system 16, and electric power is obtained. A configuration is adopted enabling this electric power to be utilized to run the mounting body 12.

In the high pressure tank apparatus 10, when an internal pressure of the liner 52 lowers due to the hydrogen gas to be supplied to the fuel cell system 16 being discharged as described above, a pressing force with which the liner 52 is pressed toward the reinforced layer 50 becomes smaller, so it becomes easy for the hydrogen gas that has permeated the liner 52 to enter the covered section 85. The temporary release fluid led out by the supplying/discharging-side lead-out hole 84*a*, of the hydrogen gas that has entered the covered section 85 flows into the supplying/discharging-side discharge flow path 26*a* from the inside of the cover member 20 via an insertion hole 20*a*. Moreover, the temporary release fluid led out by the end-side lead-out hole 84*b*, of the hydrogen gas that has entered the covered section 85 flows into the upstream side of the opening/closing valve 28 of the supplying/discharging-side discharge flow path 26*a* from the inside of the cover member 21 via the insertion hole 20*a* and the end-side discharge flow path 26*b*. Therefore, the temporary release fluid flows into the supplying/discharging-side discharge flow path 26*a* without being stored in the leaked fluid storage section 22, and is discharged to the discharge region A only when the opening/closing valve 28 is in the opened state.

On the other hand, in the high pressure tank apparatus 10, regarding the leaked fluid that has leaked from the connecting section 42*b* or supplying/discharging flow path 14 due to an abnormality occurring in the high pressure tank apparatus 10, as in such cases as when, for example, slackness has occurred in the connecting sections 40*a*, 40*b*, 42*a*, 42*b*, 44*a*, this leaked fluid is stored in the leaked fluid storage section 22. At this time, the inside of the cover member 20 and the inside of the leaked fluid storage section 22 are blocked as described above, so the leaked fluid is stored in the leaked fluid storage section 22 without entering the inside of the cover member 20.

In other words, the leaked fluid can be stored in the leaked fluid storage section 22 separately from the temporary release fluid. By thus detecting by the leakage detecting sensor 24 the leaked fluid within the leaked fluid storage section 22 that does not include the temporary release fluid, the leaked fluid leaking during an abnormality can be detected distinctly from the temporary release fluid led out during normal operation. As a result, it can be avoided being mistakenly detected during normal operation of the high pressure tank apparatus 10 that a leakage during an abnormality has occurred.

Next, a method of controlling the high pressure tank apparatus 10 according to the present embodiment switching the opened/closed states of the opening/closing valve 28 will be described with additional reference to FIG. 4. In this method of controlling, first, there is performed a judging step where it is judged by the control section 32 whether or not there is the condition enabling the temporary release fluid to be discharged.

In the judging step, in step S1, it is detected by the detecting unit 30 whether or not the moving speed of the mounting body 12 is the given value or more (whether or not the mounting body 12 is in the moving state). The certain value of the moving speed herein is, as described above, the minimum value of the moving speed of the mounting body 12 at which will be attained a wind pressure enabling the temporary release fluid to be favorably dispersed by the running wind. If it is detected in step S1 that the moving speed of the mounting body 12 is smaller than the given value (step S1: NO), then operation proceeds to later-mentioned step S5.

If it is detected in step S1 that the moving speed of the mounting body 12 is the given value or more (step S1: YES), then there is judged to be the condition enabling the temporary release fluid to be discharged, and operation proceeds to a valve-opening step of step S2. In the valve-opening step of step S2, a valve-opening instruction is issued to the opening/closing valve 28 by the control section 32, and the opening/closing valve 28 is set to the opened state.

Next, in step S3, it is detected by the detecting unit 30 whether or not the moving speed of the mounting body 12 is less than the given value. If it is detected in step S3 that the moving speed of the mounting body 12 is the given value or more (step S3: NO), then step S3 is repeatedly executed.

If it is detected in step S3 that the moving speed of the mounting body 12 is less than the given value (step S3: YES), then in step S4, a valve-closing instruction is issued to the opening/closing valve 28 by the control section 32, the opening/closing valve 28 is set to the closed state, and operation proceeds to step S5.

In step S5, it is detected whether or not an instruction to open the lid 118 has been issued (whether or not the fluid is being filled into the liner 52), due to the occupant pressing the lid switch, and so on. If it is detected in step S5 that an instruction to open the lid 118 has not been issued, that is, that the fluid is not being filled (step S5: NO), then operation returns to step S1, and the above-described processing is repeated.

If it is detected in step S5 that an instruction to open the lid 118 has been issued, that is, that the fluid is being filled (step S5: YES), then there is judged to be the condition enabling the temporary release fluid to be discharged, and operation proceeds to a valve-opening step of step S6. In the valve-opening step of step S6, a valve-opening instruction is issued to the opening/closing valve 28 by the control section 32, and the opening/closing valve 28 is set to the opened state.

Next, in step S7, it is detected whether or not the lid 118 has been closed. If it is detected in step S7 that the lid 118 has not been closed (step S7: NO), then step S7 is repeatedly executed, and closure of the lid 118 is awaited. If it is detected in step S7 that the lid 118 has been closed (step S7: YES), then in step S8, a valve-closing instruction is issued to the opening/closing valve 28 by the control section 32, and the opening/closing valve 28 is set to the closed state, after which operation returns to step S1, and the above-described processing is repeated.

By performing the judging step and the valve-opening step as described above, the temporary release fluid can be discharged at an appropriate timing when the condition enabling the temporary release fluid to be discharged is satisfied, conforming with states such as running, stopping, filling of the hydrogen gas, of the mounting body 12.

Moreover, the temporary release fluid can be favorably guided to the discharge region A via the supplying/discharging-side discharge flow path 26a and the end-side discharge flow path 26b, in other words, it can be avoided that the temporary release fluid is discharged to a region other than the discharge region A. Therefore, even when, for example, the high pressure tank apparatus 10 has been arranged below a floor (not illustrated) of the mounting body 12, there is no concern that the hydrogen gas will enter a cabin (not illustrated) via the floor. Hence, it also becomes possible for the high pressure tank apparatus 10 to be mounted in the mounting body 12 more easily and at lower cost, proportionally to there being no need to provide the mounting body 12 with a configuration for increasing a sealing property of the floor.

Moreover, by leading out the temporary release fluid by the supplying/discharging-side discharge flow path 26a and the end-side discharge flow path 26b as described above, it becomes possible to effectively suppress accumulation of the fluid in the covered section 85. As a result, it is possible to suppress that there occurs in the liner 52 a portion that has separated from the reinforced layer 50, or that there occurs so-called buckling where this portion that has separated from the reinforced layer 50 of the liner 52 bulges out toward an inner side of the liner 52, and it is possible to improve durability of the high pressure tank 18.

The present invention is not particularly limited to the above-described embodiments, and may be variously modified in a range not departing from the spirit of the present invention.

For example, it can be judged in the judging step that there is the condition enabling the temporary release fluid to be discharged when there has been detected at least any one of the following conditions, namely: the mounting body 12 being in the moving state; the wind pressure in the periphery of the mounting body 12 being the given value or more; the hydrogen gas being filled into the liner 52; and the current position of the mounting body 12 being the supplying place of the fluid. Moreover, when a plurality of the above-described conditions are detected, there is no particular limitation on their combination or detection order either.

In the above-described high pressure tank apparatus 10, a configuration was adopted in which the temporary release fluid was caused to flow into the supplying/discharging-side discharge flow path 26a and the end-side discharge flow path 26b via the insides of the cover members 20, 21. However, the present invention is not particularly limited to this, and in the high pressure tank apparatus 10, all that is required is that the leaked fluid storage section 22 which is capable of storing the leaked fluid, and the supplying/discharging-side discharge flow path 26a that discharges the temporary release fluid, are provided independently.

Figure 5:
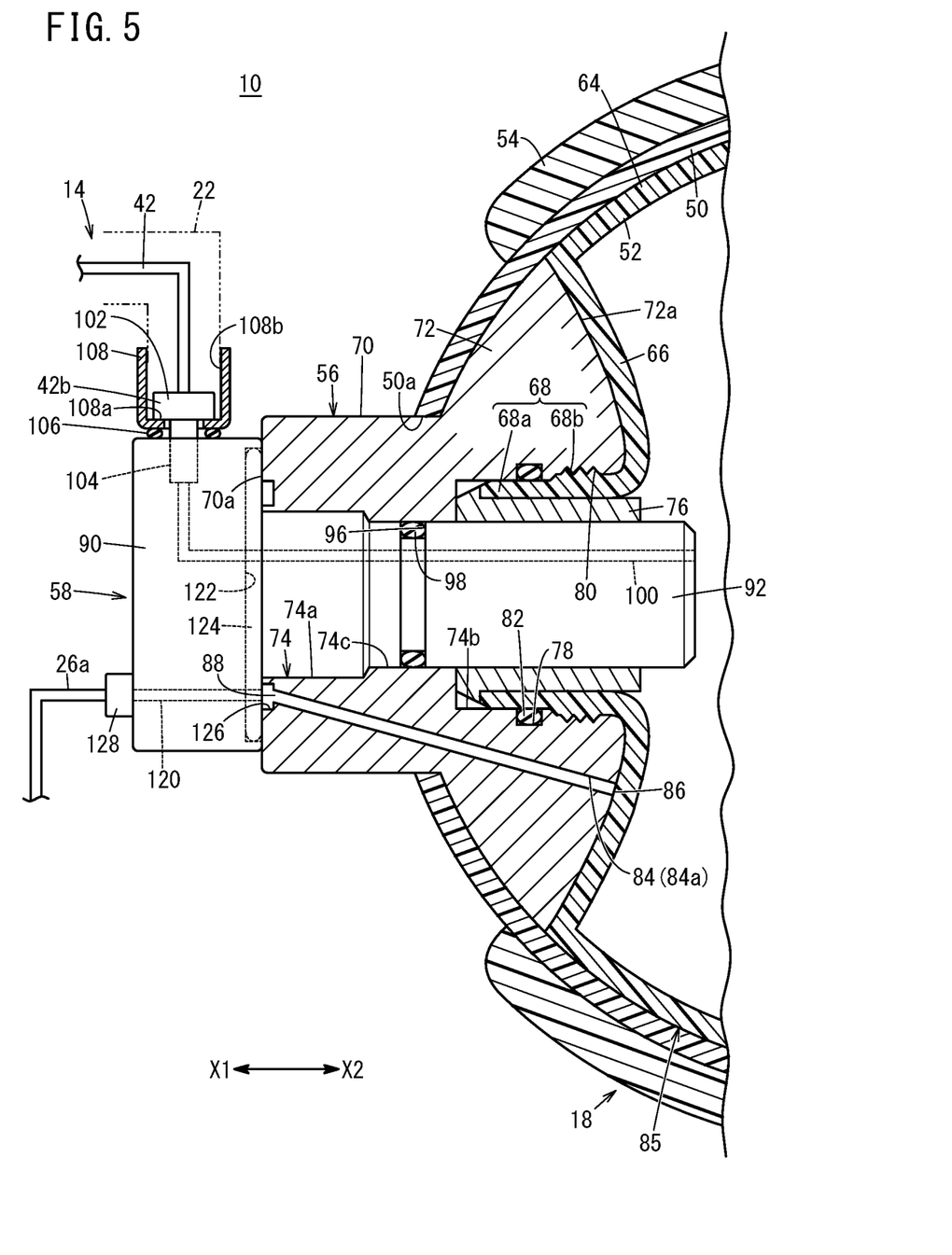
FIG. 5 is an enlarged cross-sectional view of essential parts on a side of one end in an axial direction of a high pressure tank apparatus according to a modified example.

For example, as shown in FIG. 5, the above-described high pressure tank apparatus 10 need not include the cover member 20 and the supporting plate 94 (refer to FIG. 2). In this case, a communicating hole 120 is formed in the head section 90 of the inserting member 58 penetrating the head section 90 of the inserting member 58. Moreover, the head section 90 of the inserting member 58 is provided with a seal groove 122 instead of the seal groove 112 (refer to FIG. 2) formed in the tip surface 70a of the projection 70 of the supplying/discharging-side cap 56.

The seal groove 122 is formed in a surface facing the tip surface 70a more to an outer side in the radial direction of the projection 70 than the opening 88 of the supplying/discharging-side lead-out hole 84a is, of the head section 90. A seal member 124 configured from an O ring is arranged on an inside of this seal groove 122, whereby a seal is made between the head section 90 of the inserting member 58 and a side more outward in the radial direction than the opening 88 is, of the tip surface 70a of the projection 70.

Note that when the supplying/discharging-side cap 56 is provided with a plurality of the supplying/discharging-side lead-out holes 84a, there may be provided in the tip surface 70a an annular communicating groove 126 that communicates in the radial direction each of the openings 88 of the plurality of supplying/discharging-side lead-out holes 84a.

One end side of the communicating hole 120 opens toward the communicating groove 126. The supplying/discharging-side discharge flow path 26a is connected to the other end side of the communicating hole 120 via a connecting section 128. Therefore, each of the plurality of supplying/discharging-side lead-out holes 84a communicates with the supplying/discharging-side discharge flow path 26a via the communicating groove 126 and the communicating hole 120.

The seal member 106 and the separating member 108 are sandwiched between the large outer diameter section 102 of the connecting section 42b and the head section 90. That is, the leaked fluid storage section 22 is provided to the high pressure tank 18 independently from the supplying/discharging-side discharge flow path 26a. Therefore, in this case too, the leaked fluid can be stored in the leaked fluid storage section 22 separately from the temporary release fluid, and the temporary release fluid can be caused to flow into the supplying/discharging-side discharge flow path 26a separately from the leaked fluid.

Although the above-described high pressure tank apparatus 10 adopted a configuration in which the high pressure tank 18 included the end-side cap 60 where the end-side lead-out hole 84b was formed, and the end-side discharge flow path 26b was connected to the end-side lead-out hole 84b, the present invention is not limited to this. For example, the high pressure tank 18 need not include the end-side cap 60. Moreover, the end-side cap 60 need not be provided with the end-side lead-out hole 84b. In these cases, the high pressure tank apparatus 10 need not include the end-side discharge flow path 26b.

Furthermore, in the above-described high pressure tank apparatus 10, an end-side cap 60 side of the high pressure tank 18 may be configured without including the cover member 21 and the supporting plate 94, substantially similarly to the modified example shown in FIG. 5. In this case, the temporary release fluid led out from the end-side lead-out hole 84b flows into the end-side discharge flow path 26b via the communicating groove 126 and the communicating hole 120 provided in the end-side cap 60 similarly to the supplying/discharging-side cap 56 shown in FIG. 5.

The above-described high pressure tank apparatus 10 adopted a configuration where, due to the leaked fluid storage section 22 surrounding both the connecting section 42b and the supplying/discharging flow path 14, both the leaked fluid that had leaked from the connecting section 42b and the leaked fluid that had leaked from the supplying/discharging flow path 14 could be stored. However, the leaked fluid storage section 22 may be configured capable of storing at least the leaked fluid leaking from the connecting section 42b.

Although the above-described high pressure tank apparatus 10 adopted a configuration of including one high pressure tank 18, it may include a plurality of the high pressure tanks 18. In this case, the leaked fluid leaking from the plurality of high pressure tanks 18 may be stored by one leaked fluid storage section 22, or there may be provided a plurality of the leaked fluid storage sections 22 of the same number as there are high pressure tanks 18, and the leaked fluid may be stored in the leaked fluid storage section 22 for each of the high pressure tanks 18.

The supplying/discharging flow path 14 is not limited to being configured from the likes of the above-described pipes 40, 42, 44, or branch path 36, and there may be adopted a variety of configurations enabling the hydrogen gas (the fluid) to be supplied/discharged to/from the high pressure tank 18.

What is claimed is:

1. A high pressure tank apparatus that is mounted in a mounting body and comprises a high pressure tank, and in which a fluid is routed to and from a resin-made liner of the high pressure tank via a supplying/discharging flow path,
the high pressure tank including:
a reinforced layer covering an outer surface of the liner;
a supplying/discharging hole that communicates between the supplying/discharging flow path and an inside of the liner; and
a cap having formed therein a lead-out hole that leads out the fluid interposing between the liner and the reinforced layer,
the high pressure tank apparatus comprising:
a leaked fluid storage section capable of storing a leaked fluid being the fluid that has leaked from at least a connecting section of the supplying/discharging flow path and the supplying/discharging hole;
a discharge flow path that is provided independently from the leaked fluid storage section and that is configured to discharge, to an atmosphere in a periphery of the mounting body, a temporary release fluid being the fluid that has been led out via the lead-out hole;
an opening/closing valve that selectively opens or closes the discharge flow path;
a detecting unit that is operable to detect whether or not the periphery of the mounting body is in a condition enabling the temporary release fluid to be discharged; and
a control section that is configured to selectively open the opening/closing valve when a detection result of the detecting unit indicates that the periphery of the mounting body is in the condition enabling the temporary release fluid to be discharged.

2. The high pressure tank apparatus according to claim 1, wherein:
the detecting unit is capable of detecting whether or not the mounting body is in a moving state, and
when it has been detected by the detecting unit that the mounting body is in the moving state, the control section opens the opening/closing valve, enabling the temporary release fluid to be discharged.

3. The high pressure tank apparatus according to claim 2, wherein:
the detecting unit is capable of detecting whether or not the fluid is being filled into the liner, and
when, in the case that the mounting body is not detected to be in the moving state, it has been detected by the detecting unit that the fluid is being filled, the control section opens the opening/closing valve, enabling the temporary release fluid to be discharged.

4. The high pressure tank apparatus according to claim 2, wherein:
the detecting unit is capable of detecting a current position of the mounting body, and
when, in the case that the mounting body is not detected to be in the moving state, it has been detected by the detecting unit that the current position of the mounting body is at a supplying place of the fluid, the control section opens the opening/closing valve, enabling the temporary release fluid to be discharged.

5. The high pressure tank apparatus according to claim 1, wherein:
the detecting unit is capable of detecting a wind pressure in the periphery of the mounting body, and
when it has been detected by the detecting unit that the wind pressure is a given value or more, the control section opens the opening/closing valve, enabling the temporary release fluid to be discharged.

6. The high pressure tank apparatus according to claim 1, wherein:
the detecting unit is capable of detecting whether or not the fluid is being filled into the liner, and
when it has been detected by the detecting unit that the fluid is being filled into the liner, the control section opens the opening/closing valve, enabling the temporary release fluid to be discharged.

7. The high pressure tank apparatus according to claim 1, wherein:
the detecting unit is capable of detecting a current position of the mounting body, and
when it has been detected by the detecting unit that the current position of the mounting body is at a supplying place of the fluid, the control section opens the opening/closing valve, enabling the temporary release fluid to be discharged.

8. A method of controlling a high pressure tank apparatus that is mounted in a mounting body and comprises a high pressure tank, and in which a fluid is routed to and from a resin-made liner of the high pressure tank via a supplying/discharging flow path,
the high pressure tank including:
a reinforced layer covering an outer surface of the liner;
a supplying/discharging hole that communicates between the supplying/discharging flow path and an inside of the liner; and
a cap having formed therein a lead-out hole that leads out the fluid interposing between the liner and the reinforced layer, and
the high pressure tank apparatus comprising:
a leaked fluid storage section capable of storing a leaked fluid being the fluid that has leaked from at least a connecting section of the supplying/discharging flow path and the supplying/discharging hole;
a discharge flow path that is provided independently from the leaked fluid storage section and that is configured to discharge, to an atmosphere in a periphery of the mounting body, a temporary release fluid being the fluid that has been led out via the lead-out hole;
an opening/closing valve that selectively opens and closes the discharge flow path;
a detecting unit that is operable to detect whether or not the periphery of the mounting body is in a condition enabling the temporary release fluid to be discharged; and
a control section that is configured to selectively open the opening/closing valve,
the method of controlling the high pressure tank apparatus including:
an assessment step for assessing whether where a detection result of the detecting unit indicates the presence of the condition enabling the temporary release fluid to be discharged; and
a valve-opening step which opens the opening/closing valve when, in the assessment step, the control section determines that the periphery of the mounting body is in the condition enabling the temporary release fluid to be discharged.

9. The method of controlling a high pressure tank apparatus according to claim 8, wherein, when it has been detected by the detecting unit that the mounting body is in a moving state, the control section determines in the assessment step that the periphery of the mounting body is in the condition enabling the temporary release fluid to be discharged.

10. The method of controlling a high pressure tank apparatus according to claim 9, wherein, when the mounting body is not detected to be in the moving state, and it has been detected by the detecting unit that the fluid is being filled into the liner, the control section determines in the assessment step that the periphery of the mounting body is in the condition enabling the temporary release fluid to be discharged.

11. The method of controlling a high pressure tank apparatus according to claim 9, wherein, when the mounting body is not detected to be in the moving state, and it has been detected by the detecting unit that a current position of the mounting body is at a supplying place of the fluid, the control section determines in the assessment step that the periphery of the mounting body is in the condition enabling the temporary release fluid to be discharged.

12. The method of controlling a high pressure tank apparatus according to claim 8, wherein, when it has been detected by the detecting unit that a wind pressure in the periphery of the mounting body is equal to a given value or more, the control section determines in the assessment step that the periphery of the mounting body is in the condition enabling the temporary release fluid to be discharged.

13. The method of controlling a high pressure tank apparatus according to claim 8, wherein, when it has been detected by the detecting unit that the fluid is being filled into the liner, the control section determines in the assessment step that the periphery of the mounting body is in the condition enabling the temporary release fluid to be discharged.

14. The method of controlling a high pressure tank apparatus according to claim 8, wherein, when it has been detected by the detecting unit that a current position of the mounting body is at a supplying place of the fluid, the control section determines in the assessment step that the periphery of the mounting body is in the condition enabling the temporary release fluid to be discharged.

* * * * *

UNITED STATES PATENT AND TRADEMARK OFFICE
CERTIFICATE OF CORRECTION

Page 1 of 1

PATENT NO. : 11,085,583 B2
APPLICATION NO. : 16/293013
DATED : August 10, 2021
INVENTOR(S) : Ogiwara It is certified that error appears in the above-identified patent and that said Letters Patent is hereby corrected as shown below:

In the Claims

Column 20 Line 1, Claim 8, change "an assessment step for assessing whether where a detection" to -- an assessment step for assessing whether a detection --

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*